(12) United States Patent
Watanabe et al.

(10) Patent No.: US 9,983,036 B2
(45) Date of Patent: May 29, 2018

(54) FLOW METER DEVICE

(71) Applicant: Panasonic Corporation, Kadoma-shi, Osaka (JP)

(72) Inventors: Aoi Watanabe, Nara (JP); Kouichi Takemura, Nara (JP); Yasuo Koba, Nara (JP); Masato Satou, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 423 days.

(21) Appl. No.: 14/373,827

(22) PCT Filed: Jan. 11, 2013

(86) PCT No.: PCT/JP2013/000100
§ 371 (c)(1),
(2) Date: Jul. 22, 2014

(87) PCT Pub. No.: WO2013/111527
PCT Pub. Date: Aug. 1, 2013

(65) Prior Publication Data
US 2014/0345391 A1 Nov. 27, 2014

(30) Foreign Application Priority Data

Jan. 23, 2012 (JP) .................. 2012-010654

(51) Int. Cl.
*G01F 1/66* (2006.01)
*G01F 1/72* (2006.01)
(52) U.S. Cl.
CPC ............ *G01F 1/662* (2013.01); *G01F 1/667* (2013.01); *G01F 1/72* (2013.01)
(58) Field of Classification Search
CPC . G01F 1/66; G01F 1/667; G01F 1/662; G01F 1/72
See application file for complete search history.

(56) References Cited

U.S. PATENT DOCUMENTS 5,526,699 A    6/1996  Dorr
6,065,351 A *  5/2000  Nagaoka ............... G01F 1/667
                                                73/861.28
(Continued)

FOREIGN PATENT DOCUMENTS

CN    101464171 A     6/2009
DE    19653184 A1 *   7/1998  ............ G01F 1/60
(Continued)

OTHER PUBLICATIONS

Extended European Search Report in corresponding European Application No. 13740709.4, dated Jun. 23, 2015, 7 pages.
(Continued)

*Primary Examiner* — Jennifer Simmons
*Assistant Examiner* — Leo T Hinze
(74) *Attorney, Agent, or Firm* — Brinks Gilson & Lione

(57) ABSTRACT

A measurement control section of a flow meter device causes a measurement block dividing section to divide a sampling cycle Tc into three or more, for example, four measurement blocks Tb of an equal length and causes the flow measuring section to measure the flow of a fluid in each of the measurement blocks Tb. A flow calculating section of the flow measuring section calculates an average value of flow values obtained in all of the measurement blocks in each sampling cycle Tc, as a flow value in each sampling cycle Tc. This configuration allows a flow meter device which employs an inverse transit time difference method, such as an estimation gas meter, to more effectively lessen the influence of a pulsation and to perform flow measurement with higher accuracy.

4 Claims, 5 Drawing Sheets

(56) References Cited

U.S. PATENT DOCUMENTS

| | | | |
|---|---|---|---|
| 6,796,189 B1 | 9/2004 | Umekage et al. | |
| 8,671,775 B2 * | 3/2014 | Gotou | G01F 1/66 73/861.27 |
| 2011/0246098 A1 * | 10/2011 | Takemura | G01F 1/667 702/48 |
| 2012/0185183 A1 * | 7/2012 | Takemura | G01F 1/66 702/48 |
| 2013/0167656 A1 * | 7/2013 | Takemura | G01F 1/66 73/861.28 |

FOREIGN PATENT DOCUMENTS

| | | |
|---|---|---|
| EP | 0 179 541 A2 | 4/1986 |
| JP | 11-258018 A | 9/1999 |
| JP | 2001-174306 A | 6/2001 |
| JP | 2001-241984 A | 9/2001 |

OTHER PUBLICATIONS

International Search Report in corresponding International Application No. PCT/JP2013/000100, dated Apr. 2, 2013, 1 page.
Office Action and English language translation of Search Report in corresponding Chinese Application No. 201380004201.2, dated Apr. 27, 2016, 9 pages.

\* cited by examiner

FLOW METER DEVICE

This application is a 371 application of PCT/JP2013/000100 having an international filing date of Jan. 11, 2013, which claims priority to JP 2012-010654 filed Jan. 23, 2012, the entire contents of which are incorporated herein by reference.

TECHNICAL FIELD

The present invention relates to a flow meter device which measures a flow (flow rate) of a fluid such as a gas by utilizing an ultrasonic wave. Particularly, the present invention relates to a flow meter device which measures a flow in each sampling cycle set as a minimum time unit at which the flow measurement is performed.

BACKGROUND ART

As one example of a flow meter device for measuring a flow (flow rate) of a fluid by utilizing an ultrasonic wave, there is known a flow meter device which employs an inverse transit time difference method. In the inverse transit time difference method, ultrasonic transducers (transmitters/receivers) are provided at an upstream side and a downstream side, respectively, of a fluid passage (measurement fluid passage) which is a measurement target, and alternately transmit and receive an ultrasonic wave pulse. This makes it possible to measure the flow velocity of the fluid by utilizing the transit time (propagation time) in a forward direction and the transit time in a reverse direction. Therefore, the flow of the fluid can be measured by using the flow velocity and the cross-sectional area of the measurement fluid passage.

As a specific example of the flow meter device which employs the inverse transit time difference method, there is typically an estimation gas meter. The estimation gas meter is typically configured to intermittently measure the flow of the gas within a pipe which is the measurement fluid passage by sampling, calculate an average value of the measurement values, and integrate the average values, thus obtaining a gas usage amount (integrated flow value). This sampling measurement is fundamentally performed once in every preset sampling cycle. That is, the sampling cycle revers to a cycle set as a minimum time unit at which the flow measurement is performed.

In the estimation gas meter having the above configuration, it is not necessary to include a mechanical activation section for the flow measurement, as compared to a conventional actual capacity (actual measurement) gas meter (e.g., membrane gas meter). Because of this, in the estimation gas meter, the number of components can be reduced, and therefore reduction of a size and cost can be attained.

By the way, the gas is a compressive fluid, differently from a liquid such as water. Therefore, a pulsation is more likely to occur in a gas flow while the gas is passing through a device which compresses the gas, such as a gas engine heat pump (GHP). It is known that in the estimation gas meter, an error occurs in the gas flow measurement if this pulsation overlaps with the sampling cycle.

Especially, in the case of occurrence of cyclic pulsation, if the pulsation cycle and the sampling cycle coincide with each other or get close to each other, or the pulsation cycle is an integer multiple of the sampling cycle, there may be a possibility that only peak values or bottom values of the pulsation are measured as gas flow values. In such cases, an error of the gas flow values becomes relatively large. If the flow values containing the error are integrated, the gas usage amount which is the integrated value would significantly deviate from an actual usage amount.

Under the above stated circumstances, there have been conventionally proposed various techniques for obtaining accurate gas flow values even when a pulsation occurs in the gas flow. For example, Patent Literature 1 discloses that a flow measuring method and a flow meter device which change the phase of start of a measurement period according to a predetermined rule. Specifically, a time length Td is set in each measurement period T, and the cycle or phase of timing of start of each of the plurality of measurement periods T is changed according to the predetermined rule so that this cycle or phase is made different from the cycle or phase of the pulsation actually measured.

Patent Literature 1: Japanese-Laid Open Patent Application Publication No. 2001

SUMMARY OF THE INVENTION

Technical Problem

In recent years, communication networks have been increasingly utilized for meter reading of gas meters. Therefore, techniques for providing communication functions to the gas meters have been proposed, and these gas meters have been put into practical use. The estimation gas meter which employs the inverse transit time difference method is capable of measuring the gas flow in several seconds by transmitting and receiving the ultrasonic wave and of obtaining the measured flow value as digital data. Therefore, the estimation gas meter can be connected to the networks or other devices to construct a system, via the communication functions.

In particular, if the estimation gas meter cooperates with a gas leakage alarm device or other alarm device by connecting it to the network or incorporating it into the system, it is allowed to have security functions. To address such situations, it is required that the estimation gas meter perform flow measurement with higher accuracy.

In the situation so far, it became possible to provide the estimation gas meter which can effectively lessen the influence of the pulsation, by using the technique disclosed in Patent Literature 1. However, as described above, the technique disclosed in Patent Literature 1 is such that the timing of start of the flow measurement (measurement period T) is changed by the time length Td in each sampling cycle. Therefore, this technique may be incapable of well addressing a case where the pulsation occurs singly or a case where the pulsation occurs with a cycle which is different from that assumed. Under the circumstances, in the situation assumed from now, it will be necessary to further lessen the pulsation.

The present invention has been made to solve the above described problem, and an object of the present invention is to allow a flow meter device which employs an inverse transit time difference method, such as an estimation gas meter, to more effectively lessen the influence of a pulsation and to perform flow measurement with higher accuracy.

Solution to Problem

In order to solve the problems, a flow meter device of the present invention comprises a flow measuring section which includes a pair of ultrasonic transducers which are placed at an upstream side and a downstream side, respectively, in a measurement fluid passage through which a fluid as a measurement target flows, and measures a flow of the fluid by transmitting and receiving an ultrasonic wave between the ultrasonic transducers; and a measurement control section which controls the flow measuring section such that the flow measuring section measures the flow of the fluid in each sampling cycle set as a minimum time unit at which the flow of the fluid is measured; wherein the measurement control section divides the sampling cycle into three or more measurement blocks of an equal length and causes the flow measuring section to measure the flow of the fluid in each of the measurement blocks; and wherein the flow measuring section calculates an average value of flow values obtained in all of the measurement blocks in each sampling cycle, as a flow value in each sampling cycle.

In the flow meter device having the above described configuration, the measurement control section may control the flow measuring section such that the flow measuring section measures the flow at a random timing in each of the measurement blocks.

In the flow meter device having the above described configuration, the flow measuring section may include at least: the pair of ultrasonic transducers; a transmission/reception switching section which performs switching between transmission and reception of the ultrasonic transducers; an oscillation driving section which drives one of the ultrasonic transducers at a transmission side such that the ultrasonic transducer at the transmission side transmits the ultrasonic wave; an ultrasonic wave detecting section which detects the ultrasonic wave received by one of the ultrasonic transducers at a reception side; a propagation time measuring section which measures a propagation time of the ultrasonic wave transmitted and received between the pair of ultrasonic transducers; and a flow calculating section which calculates a flow value of the fluid based on the propagation time.

In the flow meter device having the above described configuration, the flow calculating section may include: a measurement block flow calculating section which calculates a flow value in each of the measurement blocks and stores the flow value; and a sampling cycle flow calculating section which calculates an average value of flow values stored by the measurement block flow calculating section, in each sampling cycle.

The above and further objects, features and advantages of the invention will more fully be apparent from the following detailed description with accompanying drawings.

Advantageous Effects of the Invention

As described above, in accordance with the present invention, it is possible to achieve advantages that a flow meter device which employs an inverse transit time difference method, such as an estimation gas meter, can more effectively lessen the influence of a pulsation and perform flow measurement with higher accuracy.

DETAILED DESCRIPTION OF THE PREFERRED EMBODIMENTS

Figure 1:
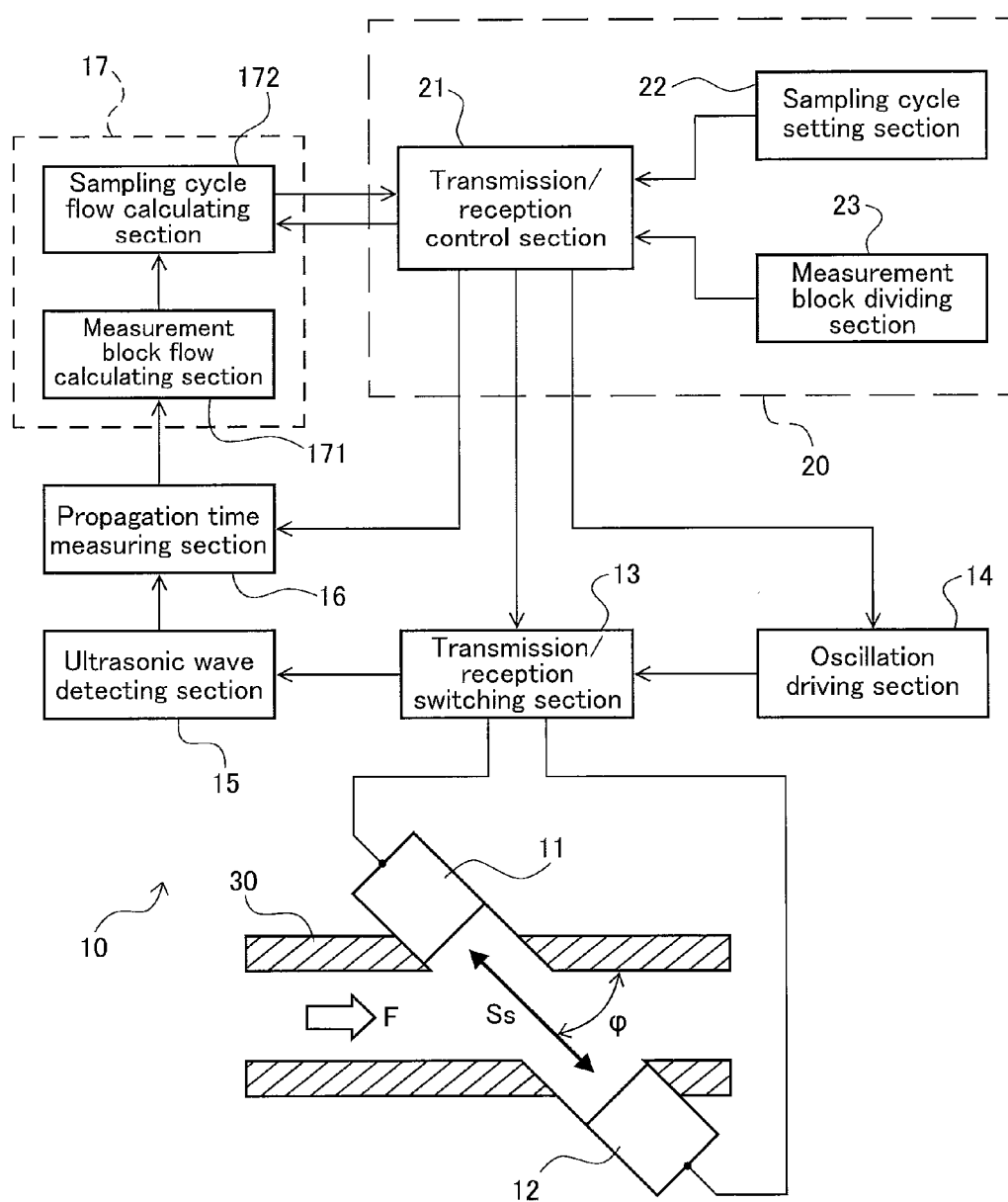
FIG. 1 is a block diagram showing the configuration of a flow meter device according to Embodiment 1 of the present invention.

Hereinafter, preferred embodiments of the present invention will be described reference to the drawings. Throughout the drawings, the same or corresponding components are identified by the same reference numerals and will not be descried repeatedly.

Embodiment 1

[Configuration of Flow Meter Device]

Now, the configuration of a flow meter device according to Embodiment 1 of the present invention will be specifically described with reference to FIG. 1. The flow meter device of the present embodiment is an estimation gas meter which employs an inverse transit time difference method. A fluid which is a measurement target is a gas. As shown in FIG. 1, the flow meter device includes a flow measuring section 10 and a measurement control section 20.

The flow measuring section 10 includes a pair of ultrasonic transducers (transmitters/receivers) 11, 12, a transmission/reception switching section 13, an oscillation driving section 14, an ultrasonic wave detecting section 15, a propagation time (transit time) measuring section 16, and a flow calculating section 17. The pair of ultrasonic transducers 11, 12 are placed so as to face each other in a direction crossing a measurement fluid passage 30 through which the measurement target gas flows. In the present embodiment, as shown in FIG. 1, the first ultrasonic transducer 11 and the second ultrasonic transducer 12 are placed so as to face each other in the direction crossing the measurement fluid passage 30 in an inclined state. When a flow direction of the gas within the measurement fluid passage 30 is an arrow F in FIG. 1, the first ultrasonic transducer 11 and the second ultrasonic transducer 12 are placed to face each other in a direction which is inclined with an angle φ with respect to the flow direction F.

The first ultrasonic transducer 11 and the second ultrasonic transducer 12 transmit and receive an ultrasonic wave between them. The specific configuration of the first ultrasonic transducer 11 and the second ultrasonic transducer 12 is not limited, and known ultrasonic transducers which are capable of transmitting and receiving the ultrasonic wave may be used. In the present embodiment, known piezoelectric ceramic transducers are used.

The transmission/reception switching section 13 performs switching between transmission and reception of the pair of ultrasonic transducers 11, 12 in a constant cycle under control of the measurement control section 20. The oscillation driving section 14 drives one of the pair of ultrasonic transducers 11, 12 which is set as a transmission side to transmit the ultrasonic wave to the other. The ultrasonic wave detecting section 15 detects the ultrasonic wave received by one of the pair of ultrasonic transducers 11, 12 which is set as a reception side.

More specifically, for example, when the transmission/reception switching section 13 sets the first ultrasonic transducer 11 as the transmission side and the second ultrasonic transducer 12 as the reception side, the oscillation driving section 14 drives the first ultrasonic transducer 11 to transmit the ultrasonic wave to the second ultrasonic transducer 12 (see bidirectional arrow Ss in FIG. 1). The second ultrasonic transducer 12 receives the ultrasonic wave transmitted from the first ultrasonic transducer 11, and the ultrasonic wave detecting section 15 detects the received ultrasonic wave. After that, the transmission/reception switching section 13 sets the first ultrasonic transducer 11 as the reception side and the second ultrasonic transducer 12 as the transmission side, and under this setting, the ultrasonic wave is transmitted and received in the same manner.

The propagation time measuring section 16 measures propagation time (transit time) of the ultrasonic wave detected by the ultrasonic wave detecting section 15. Specifically, in the case where the first ultrasonic transducer 11 is set as the transmission side and the second ultrasonic transducer 12 is set as the reception side, the propagation time measuring section 16 measures time that lapses from when the first ultrasonic transducer 11 transmits the ultrasonic wave until the second ultrasonic transducer 12 receives the ultrasonic wave. The flow calculating section 17 calculates a gas flow value (value of flow rate of gas) based on the propagation time detected by the propagation time measuring section 16. In the present embodiment, the flow calculating section 17 includes a measurement block flow calculating section 171 and a sampling cycle flow calculating section 172. How these flow calculating sections 171, 172 calculate the flow will be described later.

The specific configurations of the transmission/reception switching section 13, the oscillation driving section 14, the ultrasonic wave detecting section 15, the propagation time measuring section 16, and the flow calculating section 17 are not particularly limited. As the transmission/reception switching section 13, the oscillation driving section 14, the ultrasonic wave detecting section 15, the propagation time measuring section 16, and the flow calculating section 17, a switching circuit, a driving circuit, a reception circuit, a measuring circuit, a calculating circuit, and the like, which are known in the field of the ultrasonic transducer, can be suitably used. Also, the transmission/reception switching section 13, the oscillation driving section 14, the ultrasonic wave detecting section 15, the propagation time measuring section 16, and the flow calculating section 17 may be configured as independent circuits or the like, or may be mounted on a single board. Or, when the flow calculating section 17 is an arithmetic element such as CPU and a storage section such as a memory, at least a portion of the transmission/reception switching section 13, the oscillation driving section 14, the ultrasonic wave detecting section 15, and the propagation time measuring section 16 may be implemented by the operation of the arithmetic element which takes place according to programs stored in the storage section, i.e., functional configuration of the arithmetic element.

The specific configuration of the flow measuring section 10 is not limited to that of FIG. 1, but may be other known configuration. Therefore, in the present embodiment, it is sufficient that the flow measuring section 10 is configured to measure the flow of the fluid by transmission and reception of the ultrasonic wave between the pair of ultrasonic transducers 11, 12, and the flow measuring section 10 may be configured not to include at least a portion of the transmission/reception switching section 13, the oscillation driving section 14, the ultrasonic wave detecting section 15, the propagation time measuring section 16, and the flow calculating section 17, or may be configured to include other elements in addition to these sections.

The measurement control section 20 includes a transmission/reception control section 21, a sampling cycle setting section 22, and a measurement block dividing section 23. The transmission/reception control section 21 controls the operations of the transmission/reception switching section 13, the oscillation driving section 14, the propagation time measuring section 16, and the flow calculating section 17 (to be precise, sampling cycle flow calculating section 172) so that the ultrasonic wave is transmitted and received between the first ultrasonic transducer 11 and the second ultrasonic transducer 12, and flow measurement is performed. Note that the transmission/reception control section 21 may control the operations of the ultrasonic wave detecting section 15 (and the measurement block flow calculating section 171), depending on the configurations of the ultrasonic wave detecting section 15 (and the measurement block flow calculating section 171).

The sampling cycle setting section 22 sets a sampling cycle which is a minimum time unit for the flow measurement. The transmission/reception control section 21 controls the operations of the transmission/reception switching section 13, and the like in every set sampling cycle so that the ultrasonic wave is transmitted and received between the first ultrasonic transducer 11 and the second ultrasonic transducer 12. The measurement block dividing section 23 divides the sampling cycle into a plurality of measurement blocks. The measurement blocks are time zones with an equal time length. The measurement block dividing section 23 divides the sampling cycle into three or more measurement blocks. The transmission/reception control section 21 causes the first ultrasonic transducer 11 and the second ultrasonic transducer 12 to transmit and receive the ultrasonic wave in each of the measurement blocks which are lower cycles into which the sampling cycle is divided equally.

The measurement control section 20 may be basically configured to cause the flow measuring section 10 to measure the flow in every sampling cycle. The flow value in the flow measurement is not the flow value calculated in the flow measurement in each measurement block, but is the flow value in the whole sampling cycle. Hereinafter, the former will be referred to as a block flow value and the latter will be referred to as a cycle flow value. In this case, the cycle flow value is calculated as an average value of the block flow values in a single sampling cycle.

The specific configurations of the transmission/reception control section 21, the sampling cycle setting section 22, and the measurement block dividing section 23 are not particularly limited. For example, the transmission/reception control section 21 may be constituted by the arithmetic element such as the CPU and the storage section such as the memory, while the sampling cycle setting section 22 and the measurement block dividing section 23 may be constituted by a logic circuit, etc., including a switching element, a subtractor, a comparator, etc., which are known. Or, in the case where the measurement control section 20 is constituted by the arithmetic element such as the CPU, the transmission/reception control section 21, the sampling cycle setting section 22, and the measurement block dividing section 23 may be functional configurations of the measurement control section 20. In this case, the arithmetic element operates according to the programs stored in the storage section, thereby implementing the transmission/reception control section 21, the sampling cycle setting section 22, and the measurement block dividing section 23.

[Sampling Cycle and Measurement Blocks]

Next, a description will be given of the above mentioned sampling cycle and measurement blocks, and a flow measurement method (including the configurations of the measurement block flow calculating section 171 and of the sampling cycle flow calculating section 172) with reference to FIGS. 2A and 2B.

Figure 2A:
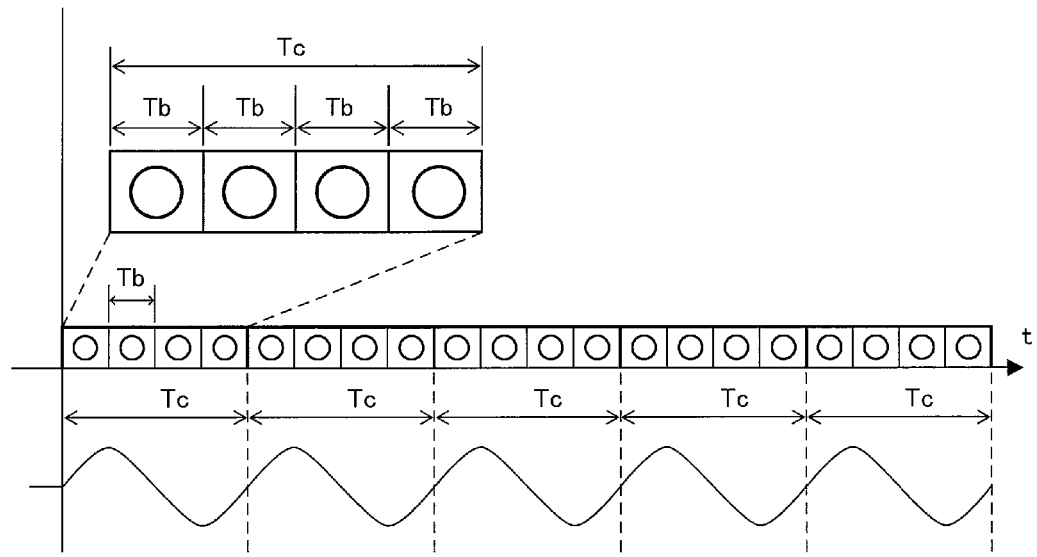
FIG. 2A is a time chart showing an example of the relationship between a pulsation, and exemplary configurations of a sampling cycle and of measurement blocks in the flow meter device of FIG. 1.
Figure 2B:
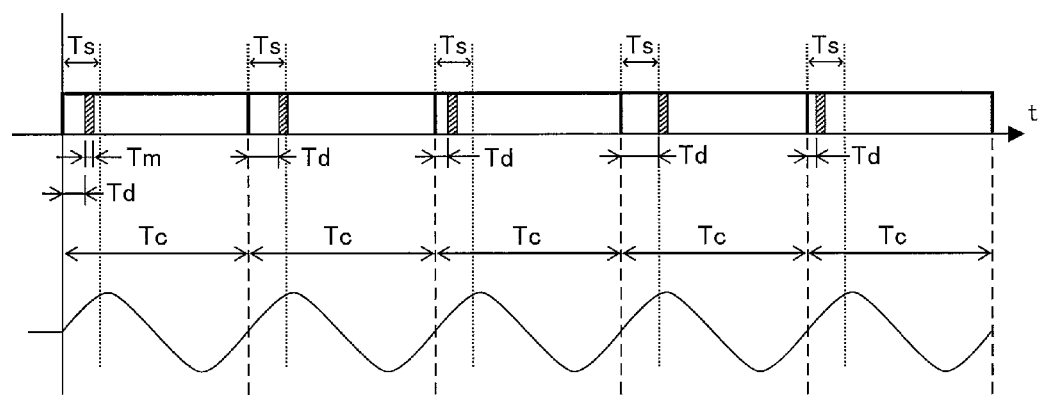
FIG. 2B is a time chart showing the relationship between a sampling cycle and a pulsation in a conventional flow meter device.

In the conventional flow meter device disclosed in Patent Literature 1 (hereinafter will be simply referred to as the conventional flow meter device), as shown in FIG. 2B, the flow (rate) is measured once for a flow measurement operation time Tm indicated by a hatched region of FIG. 2B, in every sampling cycle Tc of a specified time length. In FIGS. 2A and 2B, a horizontal axis indicates a time t and the sampling cycle Tc is illustrated as a zone. In the present embodiment, for example, the sampling cycle Tc is set to 2 seconds and the flow measurement operation time Tm is set to about 200 milliseconds.

As described above, the sampling cycle Tc is set to a minimum time unit for the flow measurement. This is because a power supply for the estimation gas meter is a built-in battery rather than an outside power supply. In other words, the estimation gas meter is required to use the battery as the power supply because of its use conditions, and the battery will be exhausted in a short time if electric power consumption increases. This causes a need to reduce the electric power consumption to a least possible level. However, the flow measurement must be performed with a frequency which provides high accuracy of the gas flow value. In light of these, the sampling cycle Tc is set so that reduction of the electric power consumption and high accuracy of the flow measurement are achieved. Although the sampling cycle Tc is typically set to 2 seconds as described above, the present invention is not limited to this. The sampling cycle Tc may be set to a different length depending on a use environment or a measurement target fluid.

As described above, in the conventional flow meter device, control is performed such that the timing of start of the flow measurement operation time Tm (corresponding to measurement period T in Patent Literature 1) is changed by the time length Td. When the time length Td is referred to as a delay time Td, the length of the delay time Td is made different among the sampling cycles Tc as shown in FIG. 2B. Therefore, in the respective sampling cycles Tc, the flow measurement is started randomly.

Note that in the conventional flow meter device, the maximum value of the delay time Td is set to a maximum delay time Ts (e.g., Ts=300 milliseconds). In other words, in each sampling cycle Tc, the timing of start of the flow measurement is set to fall within a range of 0 millisecond to 300 milliseconds.

It is supposed that under the above stated setting, a pulsation which synchronizes with the sampling cycle Tc occurs as indicated by a lowermost side of FIG. 2B. In the example of FIG. 2B, a rising timing of the pulsation always overlaps with the delay time Td. Therefore, even if the start of the flow measurement is changed randomly, the flow measurement operation time Tm synchronizes with the pulsation. In use environments so far, measurement accuracy which is not problematic in practical use has been ensured by the conventional flow meter device. However, in the situations assumed from now, it becomes necessary to lessen the influence of the pulsation more effectively.

For this purpose, in the flow meter device of the present embodiment, as shown in FIG. 2A, the measurement block dividing section 23 of the measurement control section 20 divides the sampling cycle Tc into three or more (four in the example of FIG. 2A) equal measurement blocks Tb, and the transmission/reception control section 21 causes the flow measuring section 10 to measure the flow in every measurement block Tb.

For example, as shown in the enlarged first sampling cycle Tc at the upper side of FIG. 2A, the measurement block dividing section 23 divides the sampling cycle Tc into four measurement blocks Tb (Tb=0.5 second).

The transmission/reception control section 21 causes the flow measuring section 10 to measure the flow in the first to fourth measurement blocks Tb. That is, as shown in FIG. 2A, the flow measurement is performed in all blocks expressed as "○".

The measurement block flow calculating section 171 of the flow calculating section 17 calculates the gas flow values measured in all of the first to fourth measurement blocks, and stores these gas flows. After that, the sampling cycle flow calculating section 172 of the flow calculating section 17 obtains information relating to the sampling cycle Tc from the transmission/reception control section 21, and the gas flow values measured in all of the first to fourth measurement blocks from the measurement block flow calculating section 171, and calculates an average value of these flow values as the flow value in the sampling cycle Tc.

At a lowermost side of FIG. 2A, a pulsation is shown as synchronizing with the sampling cycle Tc. However, as can be clearly seen from FIG. 2A, the pulsation does not synchronize with the measurement blocks Tb, and the flow measurement can be carried out substantially randomly by using the measurement blocks Tb. This makes it possible to more effectively lessen the influence of the pulsation and achieve higher accuracy of flow measurement than in the conventional example.

That is, in the present invention, instead of performing the flow measurement only once in every sampling cycle Tc, the flow measurement is performed in all of the plurality of measurement blocks Tb into which the sampling cycle Tc is divided. In this way, random flow measurement can be performed as compared to the conventional example.

As shown in FIG. 2B, in the conventional example, there is a difference in the start time of the flow measurement among the sampling cycles Tc, and therefore the start timings of the flow measurement in respective sampling cycles Tc are random. However, when the continuous sampling cycles Tc are seen as a whole, the random start timings fall within a particular cycle, which is from the start of the sampling cycle Tc until the maximum delay time Ts. Because of this, the flow measurement can be performed randomly in the present invention as compared to the conventional example.

Figure 3:
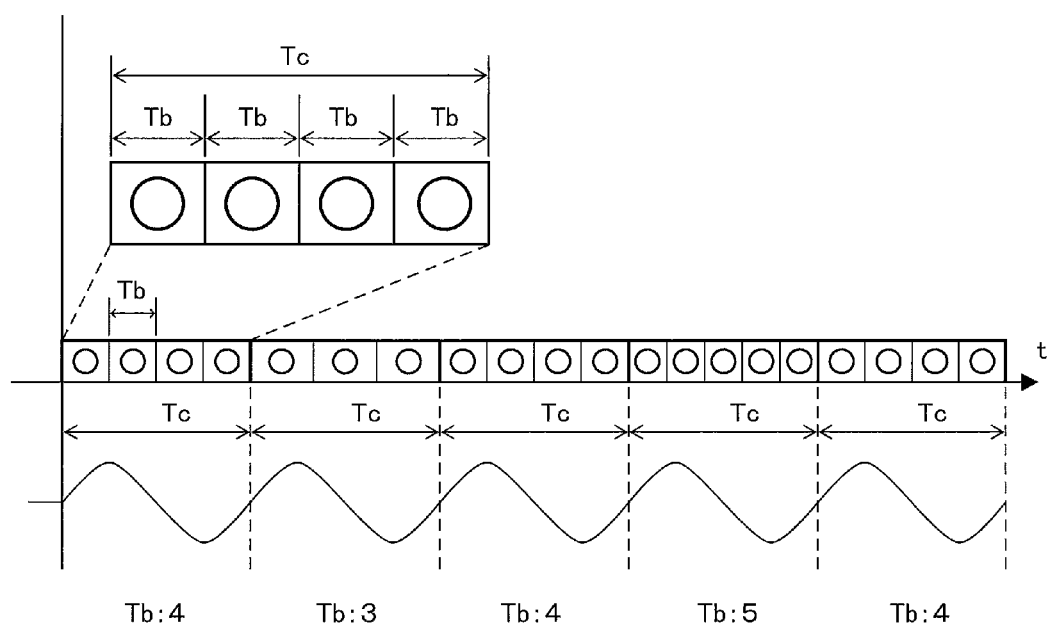
FIG. 3 is a time chart showing another example of the relationship between a pulsation, and exemplary configurations of the sampling cycle and of the measurement blocks in the flow meter device of FIG. 1.

Although in the present embodiment, the sampling cycle Tc is divided into the four measurement blocks Tb, the number of division is not limited to this. It is sufficient that the sampling cycle Tc is divided into three or more measurement blocks. The upper limit of division not particularly limited and may be decided in view of conditions such as the length of the flow measurement operation time Tm, the upper limit of electric power consumption, a demanded frequency of the flow measurement, etc. Specifically, for example, as shown in FIG. 3, the sampling cycle Tc may be divided into three measurement blocks Tb (see second sampling cycle Tc of FIG. 3). Or, the sampling cycle Tc may be divided into five measurement blocks Tb (see fourth sampling cycle Tc of FIG. 3). Or, the sampling cycle Tc may be divided into six or more measurement blocks Tb (not shown).

In the example of FIG. 2, each of all of the sampling cycles Tc is divided into the four measurement blocks Tb. By comparison, in the example of FIG. 3, each of the first, third and fifth sampling cycles Tc is divided into the four measurement blocks Tb, the second sampling cycle Tc is divided into three measurement blocks Tb, and the fourth sampling cycle Tc is divided into five measurement blocks Tb. In this way, in the present invention, the number of the measurement blocks Tb (number of division) may be varied among the sampling cycles Tc. In this case, the number of measurement blocks Tb may be varied randomly or cyclically in a predetermined order.

Although in the present embodiment, the pair of ultrasonic transducers 11, 12 are placed so as to face each other in the direction crossing the measurement fluid passage 30 with an angle φ, they may be placed at the same side of the measurement fluid passage 30, for example. In this configuration, the ultrasonic wave transmitted from one of the ultrasonic transducers 11, 12 at the transmission side is reflected on the inner wall of the measurement fluid passage 30 and received by the other of the ultrasonic transducers 11, 12 at the reception side. Alternatively, the measurement fluid passage 30 may be integrated with the ultrasonic transducers 11, 12 to construct an ultrasonic measuring unit.

Moreover, although in the present embodiment, the estimation gas meter is illustrated as the flow meter device, the present invention is not limited to this. The present invention is widely suitably used in the flow meter devices each of which includes the pair of ultrasonic transducers and measures the flow of the fluid by transmitting and receiving the ultrasonic wave.

Embodiment 2

Figure 4:
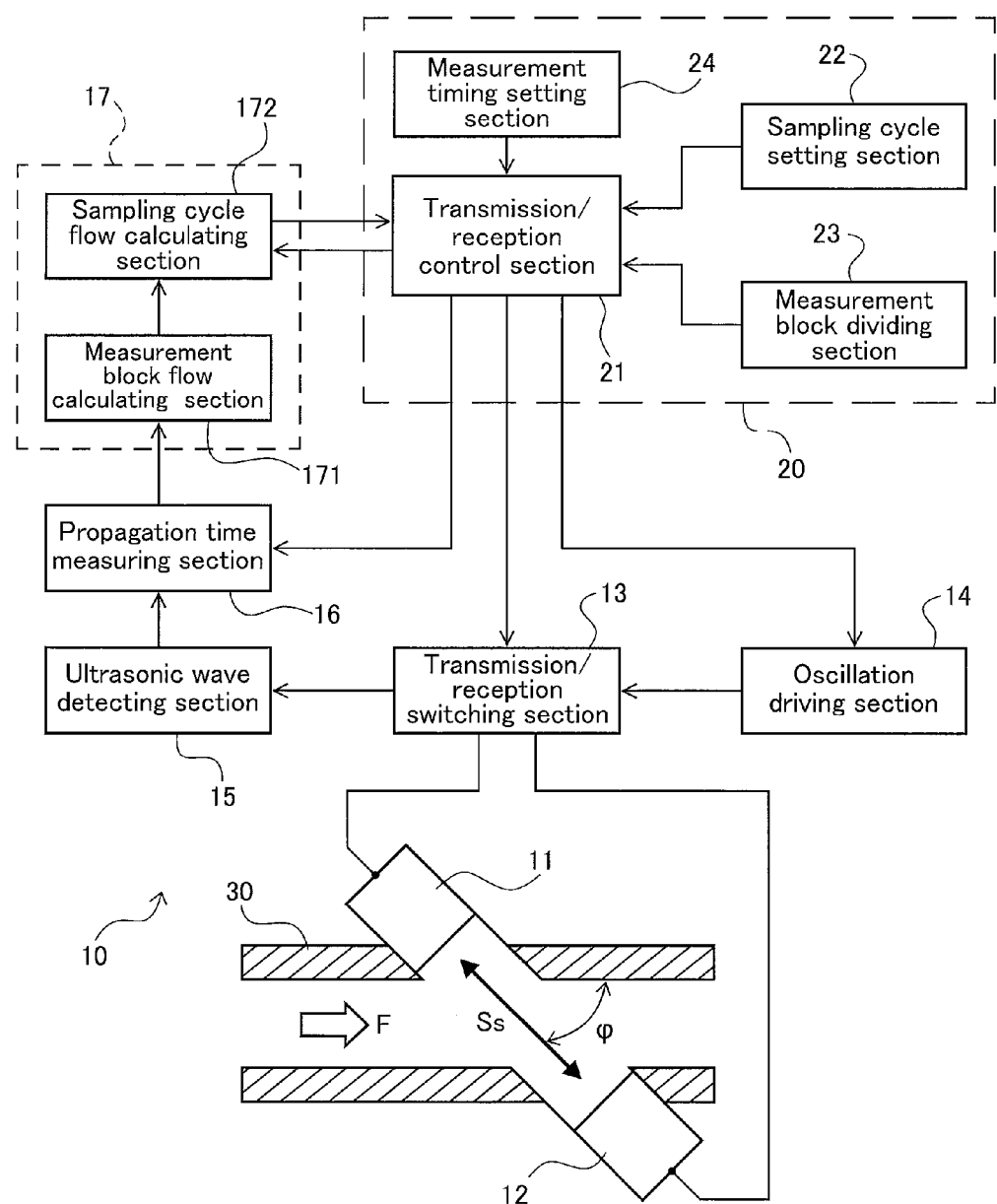
FIG. 4 is a block diagram showing the configuration of a flow meter device according to Embodiment 2 of the present invention.
Figure 5:
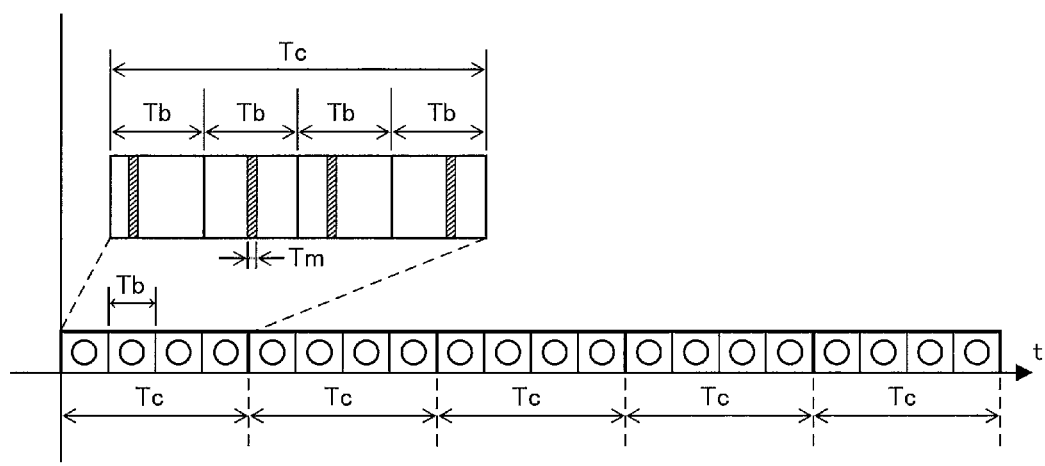
FIG. 5 is a time chart showing exemplary configurations of the sampling cycle and of the measurement blocks in the flow meter device of FIG. 4.

A flow meter device according to Embodiment 2 of the present invention will be described specifically with reference to FIGS. 4 and 5. As shown in FIG. 4, the flow meter device of the present embodiment is fundamentally the same as the flow meter device of Embodiment 2, but is different from the same in that the measurement control section 20 includes a measurement timing setting section 24.

The measurement timing setting section 24 sets the timing of the flow measurement performed in each measurement block. The transmission/reception control section 21 performs the flow measurement in each measurement block at the timing set by the measurement timing setting section 24. In this case, the measurement timing setting section 24 may set the timing so that the flow measurement is performed in the respective measurement blocks at the same timing. However, if the measurement timing setting section 24 sets the respective timings of the flow measurement in the respective measurement blocks to random timings, the flow measurement can be performed randomly as compared to the conventional example.

Specifically, as in Embodiment 1, it is supposed that the sampling cycle Tc is divided into the four measurement blocks Tb. As shown in FIG. 5, when the flow measurement operation times Tm of the measurement blocks Tb are indicated by hatched regions, respectively, the timings of the flow measurement are made different from each other among the first to fourth measurement blocks Tb.

By varying the timing of the flow measurement among the measurement blocks, it becomes less likely that the pulsation and the flow measurement operation time Tm synchronize with each other, even when the pulsation is short and synchronizes with the length of the measurement block Tb.

The specific configuration of the measurement timing setting section 24 is not particularly limited, and may be constituted by a logic circuit, etc., including a switching element, a subtractor, a comparator, etc., which are known, or may be a functional configuration of the measurement control section 20 in the case where the measurement control section 20 is constituted by the arithmetic element, as in the transmission/reception control section 21, the sampling cycle setting section 22, and the measurement block dividing section 23, as described in Embodiment 1.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The present invention is suitably used in the field of flow measurement of a gas which utilizes an inverse transit time difference method, such as an estimation gas meter, and is widely used in the field of the measurement of the flow in which a pulsation may occur.

The invention claimed is:

1. A flow meter device configured to measure the flow of a compressible fluid subject to compression pulsations in the fluid, the device comprising:
    a flow measuring section which includes a pair of ultrasonic transducers which are placed at an upstream side and a downstream side, respectively, in a measurement fluid passage through which a fluid as a measurement target flows, and measures a flow of the fluid by transmitting and receiving an ultrasonic wave between the ultrasonic transducers; and
    a measurement control section which controls the flow measuring section such that the flow measuring section measures the flow of the fluid in each sampling cycle set as a minimum time unit at which the flow of the fluid is measured;
    wherein the measurement control section divides the sampling cycle into three or more measurement blocks of an equal length irrespective of pulsation amplitude and causes the flow measuring section to measure the flow of the fluid once in each of the measurement blocks; and
    a flow calculating section which calculates an average value of flow values obtained in all of the measurement blocks in each sampling cycle, as a flow value in each sampling cycle;
    wherein flow measurement is carried out substantially randomly by using the measurement blocks, such that pulsations in the fluid are not synchronized with the measurement blocks thereby reducing error in the flow values due to the influence of the pulsations in the fluid.

2. The flow meter device according to claim 1, wherein the measurement control section controls the flow measuring section such that the flow measuring section measures the flow at a random timing in each of the measurement blocks.

3. The flow meter device according to claim 1, wherein the flow measuring section includes at least:

the pair of ultrasonic transducers;

a transmission/reception switching section which performs switching between transmission and reception of the ultrasonic transducers;

an oscillation driving section which drives one of the ultrasonic transducers at a transmission side such that the ultrasonic transducer at the transmission side transmits the ultrasonic wave;

an ultrasonic wave detecting section which detects the ultrasonic wave received by one of the ultrasonic transducers at a reception side;

a propagation time measuring section which measures a propagation time of the ultrasonic wave transmitted and received between the pair of ultrasonic transducers; and a flow calculating section which calculates a flow value of the fluid based on the propagation time.

4. The flow meter device according to claim 1, wherein the flow calculating section includes:

a measurement block flow calculating section which calculates a flow value in each of the measurement blocks and stores the flow value; and a sampling cycle flow calculating section which calculates an average value of flow values stored by the measurement block flow calculating section, in each sampling cycle.

* * * * *